United States Patent [19]

Katayama

[11] Patent Number: 4,951,055
[45] Date of Patent: Aug. 21, 1990

[54] APPARATUS FOR DETECTING MATERIALS BURIED UNDER THE GROUND

[75] Inventor: Yukinori Katayama, Kanagawa, Japan

[73] Assignee: Kabushiki Kaisha Komatsu Seisakusho, Tokyo, Japan

[21] Appl. No.: 378,518

[22] PCT Filed: Nov. 11, 1987

[86] PCT No.: PCT/JP87/00874
§ 371 Date: May 15, 1989
§ 102(e) Date: May 15, 1989

[87] PCT Pub. No.: WO88/04063
PCT Pub. Date: Jun. 2, 1988

[30] Foreign Application Priority Data

Nov. 17, 1986 [JP] Japan .................. 61-273381
May 13, 1987 [JP] Japan .................. 62-116276
May 13, 1987 [JP] Japan .................. 62-116277

[51] Int. Cl.$^5$ .............................. G01V 3/12
[52] U.S. Cl. .......................... 342/22; 324/337; 324/326
[58] Field of Search ............ 342/22; 324/329, 337, 324/326

[56] References Cited

U.S. PATENT DOCUMENTS

| | | | |
|---|---|---|---|
| 3,836,960 | 9/1974 | Gehman et al. | 324/329 X |
| 4,062,010 | 12/1977 | Young et al. | 342/22 |
| 4,691,204 | 9/1987 | Hiramoto | 342/22 |
| 4,706,031 | 11/1987 | Michiguchi et al. | 324/326 X |
| 4,831,383 | 5/1989 | Ohnishi et al. | 342/22 |

FOREIGN PATENT DOCUMENTS 110969 7/1982 Japan .

OTHER PUBLICATIONS

"Undeground Raday Systems"-Electronic Communication Academy Thesis Magazine, vol. J 66–B issued Jun., 1983.
"Apparatus for Detecting Materials Buried Under the Ground"-KSD-3AM Type.
"Study of an Underground Detecting Raday (No. 2)—Measuring a Dielectric Constant of Soil"—24th SICE Academic Lecture held at Sappora, Japan on Jul. 25, 26 and 27, 1985.

*Primary Examiner*—Thomas H. Tarcza
*Assistant Examiner*—Mark Hellner
*Attorney, Agent, or Firm*—Diller, Ramik & Wight

[57] ABSTRACT

If electromagnetic waves are emitted from a plurality of points on the ground surface above a material (TG) buried under the ground, an echo image (EP) formed from the data of propagation times of reflected waves at each of the points describes a hyperbola as a result of expansion of the transmitted electromagnetic waves. An operation is carried out to overlap on the echo image (EP) a false echo image (DM) which lies on the same coordinate system and which consists of a similar hyperbolic image. If the two echo images (DM, EP) are overlapped upon each other as the result, the vertex position and the expansion of the opening of the echo image (EP) can be determined from the data of the false echo image (DM). The propagation velocity of electromagnetic waves under the ground is then calculated from the data that represents the vertex position and the expansion of the opening. After the propagation velocity of the electromagnetic waves are calculated, the position of the material (TG) under the ground is then calculated in relation to the data of propagation time at any position.

3 Claims, 12 Drawing Sheets

APPARATUS FOR DETECTING MATERIALS BURIED UNDER THE GROUND

TECHNICAL FIELD

The present invention relates to an apparatus for detecting materials buried under the ground, which radiates electromagnetic waves from a point located on the ground surface onto gas supply pipes, water supply pipes, various sorts of cables or so on buried under the ground, and receives an echo of the waves reflected on the buried material to measure the position (including a depth) of the buried material on the basis of the display of the received echo indicated on a display unit.

BACKGROUND ART

There has been conventionally known a buried-material detecting apparatus of a radar type which radiates electromagnetic waves from a transmitter mounted on a mobile vehicle toward the ground, and receives an echo of the waves reflected on a material buried under the ground at a receiver mounted on the mobile vehicle to detect the position and depth of the buried material.

This radar type buried-material detector detects the depth-direction position of a buried material object by calculating the following equation.

$$Z = (V_g \cdot t_E)/2 \qquad (1)$$

where $t_E$ denotes the round-trip propagation time of radar electromagnetic waves, $V_g$ denotes the propagation velocity of the electromagnetic waves, and 2 denotes the depth of a buried object from the ground surface.

In this connection, it is known that the wave propagation velocity varies depending on the specific dielectric constant $\epsilon_{re}$ of the ground soil and satisfies the following equation.

$$V_g = C \sqrt{\epsilon_{re}} \qquad (2)$$

where C denotes the wave propagation velocity in vacuum.

Accordingly, in order to exactly detect the depth Z of a buried object, it is necessary to previously know the specific dielectric constant $\epsilon_{re}$ of the ground soil.

To this end, there has been developed a KSD-3AM type ground explorer (manufactured by the Koden Seisakusho) which estimates the propagation velocity $V_g$ on the basis of an estimated value of the specific dielectric constant $\epsilon_{re}$ of the nature of the ground under measurement such as sandy soil or farmland soil and detects the depth of an object buried under the ground on the basis of the estimated propagation velocity. A method has also been proposed which actually takes a sample of the ground, measures the specific dielectric constant $\epsilon_{re}$ of the sample soil and detects the depth of an object buried under the ground on the basis of the measured value (The 24-th SICE Science Lecture Meeting 1505, "A Research Of Underground Exploration Radar-No 2").

In the former method of estimating the specific dielectric constant $\epsilon_{re}$, the following relationship is satisfied:

$$\Delta V_g/V_g = -(\tfrac{1}{2}) \cdot (\Delta \epsilon_{re}/\epsilon_{re}) \qquad (3)$$

where $\Delta V_g$ denotes a change in the wave propagation velocity $V_g$ with respect to a change $\Delta \epsilon_{re}$ in the specific dielectric constant $\epsilon_{re}$. Therefore, when an estimation error of the specific dielectric constant $\epsilon_{re}$ is ±20%, an error in the wave propagation velocity $V_g$ becomes ±10%, which results in that a detection error in the depth also becomes ±10%. Of course, it is impossible in this case to obtain a sufficient detection accuracy.

The latter method of actually measuring the specific dielectric constant $\epsilon_{re}$, on the other hand, provides a good detection accuracy but imposes an increased economical burden because a separate specific-dielectric-constant measuring instrument must be prepared. Further, in the case where the ground surface is covered with asphalt or the like material, this method limits the range of its use since it is difficult to takes a sample of the ground soil.

Also disclosed in a paper journal of The Institute of Electronics and Communication Engineers of Japan, entitled "Underground Radar System", June, 1983, Vol. J66-B, No. 6 pp. 713–720, is a method which estimates the propagation velocity $V_g$ on the basis of reflected waves from an object buried under the ground and detects the depth Z of the object on the basis of the estimated value of the propagation velocity. This method is advantageous in that the position of an object buried beneath an asphalt pavement can be detected, but disadvantageous in that it takes a lot of time to obtain the detection result because the method requires complicated computations including matrix computations.

In view of such circumstances, it is an object of the present invention to provide a buried-material detecting apparatus which can accurately detect in a short time the position of a material buried under the ground under any circumstances.

DISCLOSURE OF INVENTION

In accordance with the present invention, there is provided a buried-material detecting apparatus which comprises means for displaying echo images of a material buried under the ground with a depth direction of the buried material and a movement direction of a mobile vehicle as parameters, first means, on the basis of a propagation time of reflected waves obtained when the mobile vehicle is moved by a predetermined distance while emitting electromagnetic waves from a transmitter mounted on the vehicle, for forming a hyperbolic echo image and causing the hyperbolic echo image to be displayed on the display means, second means for forming a hyperbolic false echo image and causing the false echo image to be displayed on the display means, third means for inputting data to the second means to cause a displayed position of the false echo image to be shifted so that a vertex position of the false echo image and expansion of opening thereof coincide with those of the echo image of the buried material, and fourth means for calculating a propagation velocity of the electromagnetic waves in the ground on the basis of the data indicative of the vertex position ad opening expansion of the false echo image when the two displayed echo images coincide with each other; and which is characterized in that a position of the buried material is detected on the basis of the propagation velocity value calculated by the fourth means.

That is, when electromagnetic waves are emitted from a plurality of points on the ground surface above a material buried under the ground, an echo image formed on the basis of the data of propagation times of reflected waves at the respective points describes a hyperbola as a result of expansion of the transmitted electromagnetic waves. An operation is carried out to overlap on the echo image a false echo image which lies on the same coordinate system and which consists of a similar hyperbolic image. If the two echo images are overlapped upon each other as the result, the vertex position and the expansion of the opening of the echo image can be determined from the data of the false echo image. Thus, the propagation velocity of electromagnetic waves under the ground is calculated from the data that represents the vertex position and the expansion of the opening. And after the propagation velocity of the electromagnetic waves are calculated, the position of the material under the ground is calculated in relation to the data of propagation time at any position.

BEST MODE FOR CARRYING OUT THE INVENTION

Figure 1:
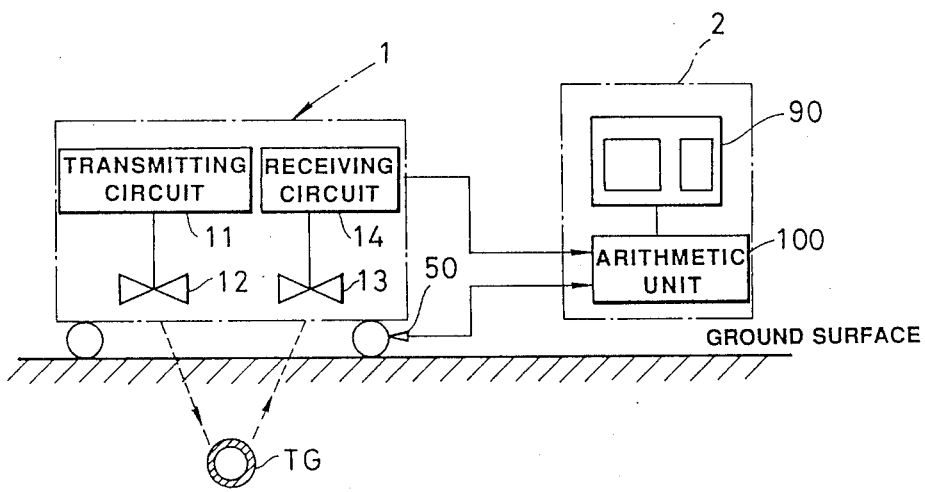
FIG. 1 is a block diagram showing a first embodiment of a buried-material detecting apparatus in accordance with the present invention.

Referring to FIG. 1, there is shown a block diagram of an embodiment of a buried-material detecting apparatus in accordance with the present invention, which is roughly divided into a mobile vehicle 1 and a body part 2. The mobile vehicle 1 comprises a transmitting circuit 11 and a radiating antenna 12 for emitting electromagnetic waves toward a target material TG buried under the ground, a receiving circuit 14 and a receiving antenna 13 for receiving an echo of the waves reflected on the target TG, and a distance sensor 50 for generating a single pulse signal each time the mobile vehicle 1 moves a unit distance. The body part 2 comprises an arithmetic unit 100 for forming an echo image of the target TG on the basis of the pulse signal received from the distance sensor 50 and an output of the receiving circuit 14 receiving the reflected echo, and a display unit 90 for indicating the formed echo image thereon.

Figure 2:
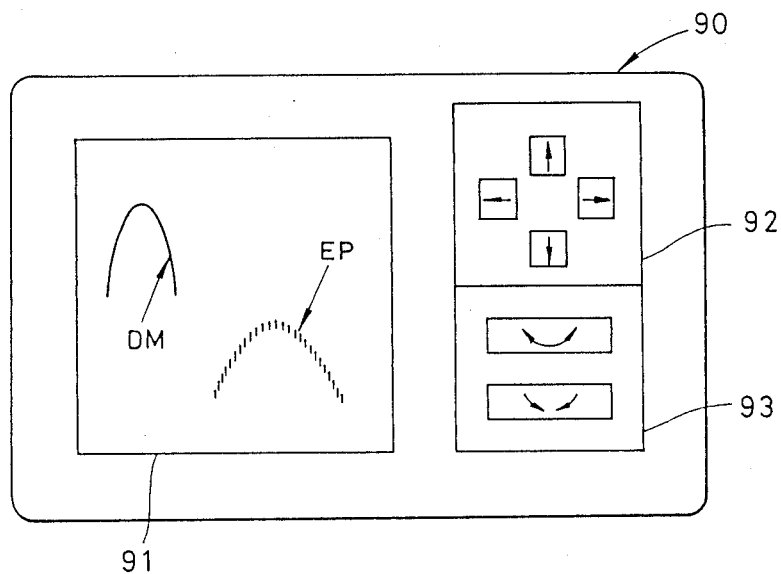
FIG. 2 is a plan view showing details of a display screen of a display unit used in the same embodiment apparatus.

Shown in FIG. 2 is a plan view of a detailed display screen of the display unit 90, which has a first display section 91 for indicating an echo image EP of the buried target material TG and a dummy or false echo image DM to be explained later, a second display section 92 for indicating pictures of positional shift switches which pushing operations cause the display position of the false echo image DM to be shifted in horizontal and vertical directions, and a third display section 93 for indicating pictures of expansion data input switches which pushing operations cause the hyperbolic opening of the false echo image DM to be variably expanded. Mounted on the entire display screen of the display unit 90 is a transparent touch panel (not shown) which detects the positions of the switches subjected to pushing operations, that is, detects the operations of the positional shift switches and expansion data input switches.

With such an arrangement as mentioned above, when electromagnetic waves are emitted from the antenna 12 through the transmitting circuit 11 while the mobile vehicle 1 is moving along the ground surface, the echo image EP of the buried target object TG describes such a hyperbola as shown in FIG. 2.

Figure 3A:
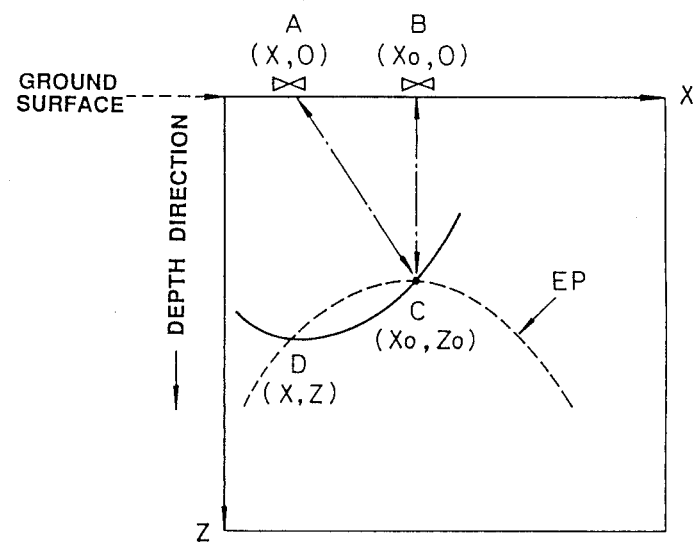
FIG. 3 shows diagrams for explaining a hyperbolic echo image.

More specifically, assume first that, as shown in FIG. 3(a), X denotes a coordinate axis showing a vehicle movement distance direction when the mobile vehicle 1 moves along the ground surface, Y denotes a coordinate axis showing a depth distance direction from the ground surface into the ground, and the target TG lies at a coordinate point C (X0, Z0). Then if the transmitting and receiving antennas 12 and 13 are located at a point B directly above the point C, the buried target material can be observed as an echo image at a depth (Z0) corresponding to a distance $\overline{BC}$ between the points B and C.

Even when the transmitting and receiving antennas 12 and 13 are moved to a point A shifted leftwardly from the right above position B of the target, the echo image of the buried target object TG can be observed, because the transmitting electromagnetic waves are divergently propagated with an expansion. In this case, the echo image can be observed at a point D corresponding to a depth $\{(X-X0)^2+Z0^2\}^{\frac{1}{2}}$ equal to a distance $\overline{AC}$ between the points A and C. Accordingly, the locus of the point D (X, Z) as the mobile vehicle 1 moves, that is, the echo image EP of the buried target object TG becomes such a hyperbola as expressed by the following equation.

$$Z = AD \qquad (4)$$
$$= \{(X - X0)^2 + Z0^2\}^{\frac{1}{2}}$$
$$= AC$$

Assuming that $t_E$ represents a round-trip time of electromagnetic waves taken from the emission of the waves from the transmitting antenna 12 to the reception thereof at the receiving antenna 13, then the round-trip time $t_E$ has such a relationship as follows with respect to the wave propagation velocity Vg and the depth Z of the target TG.

$$Z = (Vg \cdot t_E)/2 \qquad (5)$$

Hence, the following relationship is satisfied in accordance with the equations (4) and (5).

$$\{(X-X0)^2+(Vg\cdot t0/2)^2\}^{\frac{1}{2}}=(Vg\cdot t_E)/2 \quad (6)$$

where t0 represents a time required until the waves propagate and arrive at the point C, and t0 and Vg are unknowns respectively ($t_E$ represents a time required until the waves propagate and arrive at a measuring point such as the point A).

Figure 3B:
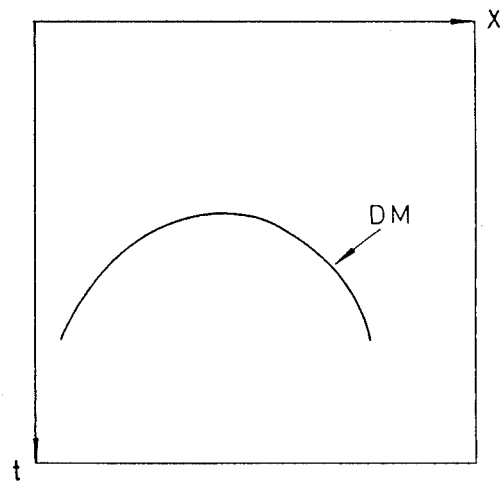

Meanwhile, the false echo image DM and the echo image EP of the buried target material TG displayed on the display section 91 of the display unit 90 are expressed in the same coordinate system. FIG. 3(b) shows the representative false echo image DM in such a coordinate system that consists of a horizontal axis X indicative of the movement distance of the vehicle 1 and a vertical axis t indicative of time. In other words, the echo image of the target TG is expressed in terms of the time axis t transformed from he depth-direction distance axis Z.

Figure 4A:
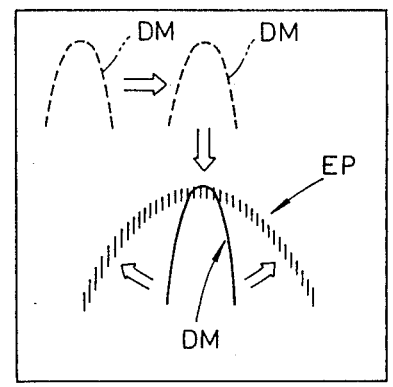
FIG. 4 shows diagrams for explaining how to overlap a false echo image on a buried-material echo image.

It is now assumed that, when the false echo image DM having a predetermined expansion is indicated at an arbitrary position on the display section 91 as shown in FIG. 4(a) and when the operator changes the origin position (X0, t0) and an expansion coefficient $\alpha$ through his pushing operation of the switches of the display sections 92 and 93 to overlap the false echo image DM on the echo image EP of the target TG, the false echo image DM satisfies a relationship which follows in the X-t coordinate system.

$$\{(X-X0)^2+(\alpha\cdot t0)^2\}^{\frac{1}{2}}=\alpha\cdot t_E \quad (7)$$

Comparison between the equations (6) and (7) with respect to their coefficients results in the following relationship.

$$Vg=2\alpha \quad (8)$$

In this case, the point (x0, t)) represents the vertex coordinate point of the false echo image DM, the coordinates of which are determined to be increased or decreased by the command switches of the display section 92. Further, the factor $\alpha$ denotes the expansion of the opening of the false echo image DM which is varied through operator's pushing operations of the displayed switches of the display section 93 so as to be increased when it is desired to enlarge the opening and to be decreased when it is desired to narrow the opening.

Figure 4B:
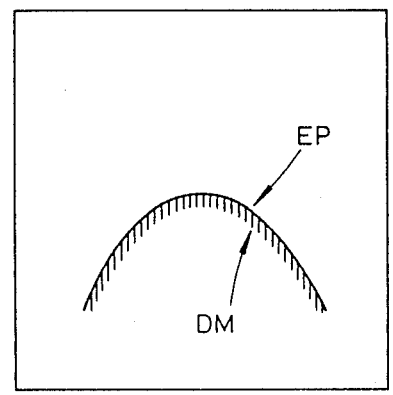

Accordingly, when the two echo images EP and DM are overlapped each other through the overlapping operation of the two echo images EP and DM as shown in FIG. 4(b), the coordinates of the origin position of the echo image EP of the buried target material TG can be obtained as coordinates (X0, t0). The expansion of the hyperbolic opening can be also obtained as the expansion value $\alpha$ of the false echo image DM. As a result, the wave propagation velocity Vg can be determined in accordance with the equation (8), and by calculating the equation (5) with the use of the obtained values Vg and t0 (the wave propagation velocity at the immediate above point B of the target TG), the origin position coordinates of the echo image EP of the buried target object TG, i.e., the depth Z can be easily obtained.

In the present embodiment of the apparatus, the depth Z of the buried target object TG is detected on the aforementioned principle, for which purpose it is necessary to first display the echo image EP of the target object TG on the display unit 90 (the first display section 91). The display of the echo image EP is carried out in such a mode as explained below in the present embodiment.

An oscillated, electromagnetic wave pulse signal, after radiated from the transmitting antenna 12 through the transmitting circuit 11, is propagated in the ground, reflected on the surface of the target object TG buried under the ground, propagated again in the ground, reaches the receiving antenna 13, and then received at the receiving circuit 14. In this embodiment apparatus, the aforementioned wave pulse signal is transmitted from the transmitting antenna 12 through the transmitting circuit 11 at intervals of a predetermined time T. during which time T a signal observed at the receiving circuit 14 is sampled at intervals of another predetermined time $T\alpha$ to obtain a string of $n\alpha$ data each time (at intervals of the time T, where $T\approx T\alpha\cdot n\alpha$). In the present apparatus, further, these data strings are previously color-grouped depending on the signal level so that these $n\alpha$ data are displayed on the first display section 91 in respectively different colors arranged in the signal level order in the direction of the time t axis (in the vertical direction) of the display section 91. The display timing of the data in the time-axis t direction are determined, in the case where a movement of the mobile vehicle 1 by a predetermined distance $L\beta$ causes the generation of a single pulse signal, by the distance resolution of the distance sensor 50, i.e., by the value of the $L\beta$. The wave pulse signal firstly oscillated from the transmitting circuit 11 after the generation of a pulse from the distance sensor 50, is displayed by an amount corresponding to one data string in the time-axis t direction, and subsequently each time the mobile vehicle 1 is moved by the distance $L\beta$, the data (echo data) corresponding to $n\beta$ strings are displayed in such a manner that such data display in the time-axis t direction is sequentially scanned in the distance-axis X direction.

After the echo image EP is displayed in this way, the false echo image DM is formed and displayed at a proper position on the display section 91 by the arithmetic unit 100, and at the same time the pictures of the positional movement switches and expansion data input switches are also displayed on the respective display sections 92 and 93.

Under such a condition, when the operator operates the positional movement switches so as to overlap the false echo image DM on the echo image EP in such a manner as has been already explained above, that is, whenever he operates the respective positional movement switches marked with "→", "↓", "→" and "←", this causes the arithmetic unit 100 to provide a predetermined increase or decrease to the initial display position coordinates ($x_s$, $t_s$) of the false echo image DM in its initial display state for its renewal. Similarly, the operator's operation of the expansion data input switches also causes the arithmetic unit 100 to provide a predetermined increase or decrease to the initial expansion coefficient $\alpha_s$ of the false echo image DM in its initial display state for its renewal. And a new false echo image DM based on new values $x_s'$, $t_s'$ and $\alpha_s'$ is formed for each renewal in accordance with the equation (7) (by substituting these values $x_s'$, $t_s'$ and $\alpha_s'$ for $x_o$, $t_o$ and $\alpha$ respectively), and then displayed on the display section 91.

As a result, when the false echo image DM is completely overlapped on the echo image EP of the buried object, the then $\alpha_s'$ is substituted for $\alpha$ in the equation (8) to calculate the propagation velocity Vg. Then, the computation of the equation (5) is executed to obtain the depth Z on the basis of a combination of the thus obtained Vg and the wave propagation time $t_s$ at the detection position corresponding to the vertex of the false echo image DM.

Since the value of the increase or decrease in the $\alpha_s$ renewal works by a factor of its square as seen from the equation (7), it is considered that the value $\alpha_s'$ abruptly varies and the renewal operation becomes difficult. To avoid this, the increase or decrease in the $\alpha_s$ is set to be renewed by a factor of its square root as in the following equation, which results in that a change in the $\alpha_s$ can be softened and good operating convenience can be realized.

$$\alpha_s' = \alpha_s + K\sqrt{\alpha}, \text{ or } \alpha_s' = \alpha_s - K\sqrt{\alpha} \text{ (K: Constant)}$$

Further, the increase or decrease in the $x_s'$, $t_s'$ or $\alpha_s'$ at the time of overlapping the false echo image DM on the echo image EP need not be constant. That is, when the false echo image DM is displayed much away from the echo image EP, the increase or decrease is made large, while when the image DM is displayed close to the image EP to within a predetermined distance range, the it is made small, thus further improving the operating convenience.

In the above embodiment, the false echo image DM is formed in accordance with the equation (7) and this equation says that a change in $t_0$ also results in a change in the expansion of the hyperbola. When the following method is employed, however, only the translational movement of the image DM in the vertical directions (time-axis direction) can be achieved without changing the expansion of the hyperbola.

For simplicity of the explanation, squaring both sides of the equation (7) gives the following equation (9) which is equivalent to the equation (7).

$$(x-x_0)^2 + (\alpha \cdot t_0)^2 = (\alpha \cdot t_E)^2 \quad (9)$$

Rewriting the equation (9) with the use of $\alpha \cdot t_0 = D$ and $t_1 = 0$ results in the following equation (10).

$$(x-x_0)^2 + D^2 = \alpha^2 \cdot (t_E - t_1)^2 \quad (10)$$

As a result, only the translational movement of the false echo image DM in the vertical directions can be achieved without any change of the expansion, when $t_1$ and $x_0$ is renewed by the increased or decreased values M and N and the false echo image DM is formed in such a manner that follows:

With respect to the positional movement switches;

| | |
|---|---|
| $t_1 \leftarrow t_1 - M$ | when the switch "↑" is pushed |
| $t_1 \leftarrow t_1 + M$ | when the switch "↓" is pushed |
| $x_0 \leftarrow x_0 - N$ | when the switch "←" is pushed |
| $x_0 \leftarrow x_0 + N$ | when the switch "→" is pushed |

With respect to the expansion data input switches; when the switch "←→" is operated, $$\alpha \leftarrow \alpha + F(\alpha)$$

$$t_0 \leftarrow t_0 + t_1$$

$$t_1 \leftarrow 0$$

$$D \leftarrow \alpha \cdot t_0$$

when the switch "→←" is operated, $$\alpha \leftarrow \alpha + F(\alpha)$$

$$t_0 \leftarrow t_0 + t_1$$

$$t_1 \leftarrow 0$$

$$D \leftarrow \alpha \cdot t_0$$

$F(\alpha)$ is a function with respect to $\alpha$.

Though the present embodiment is arranged so that the position and expansion of the false echo image DM is varied through operator's touch panel operation, such variation of the position and expansion may be realized with the use of such input means as mechanical contact switches, a keyboard or a joy stick.

Figure 5:
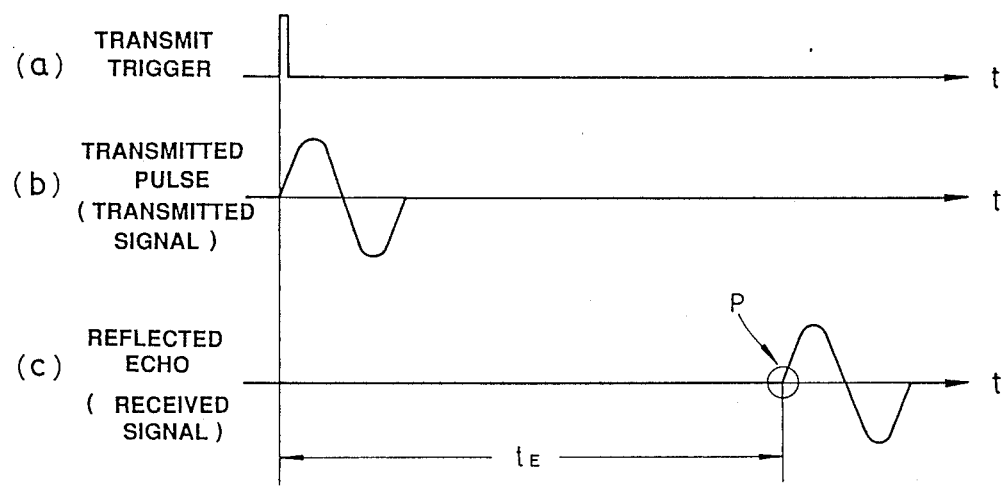
FIG. 5 is a timing chart showing a time relationship between transmitted and received electromagnetic waves.

With such a detecting apparatus, assume, for example, that, in response to the generation of such a transmitting trigger signal as shown in FIG. 5(a), when such a transmit pulse signal (electromagnetic wave pulse signal) as shown in FIG. 5(b) is formed and then emitted into the ground, the apparatus receives such a reflected echo signal as shown in FIG. 5(c) from a target object buried under the ground a time $t_E$ after the emission of the transmit pulse signal. Then, the apparatus confirms the presence of the buried target object TG on the basis of the reception of the reflected echo signal, and at the same time, measures the depth of the target TG below the ground surface on the basis of the wave propagation time $t_E$.

Therefore, indispensable for obtaining the depth of the buried target object accurately in such a detecting apparatus is the accurate identification of the wave propagation time $t_E$ and accordingly the accurate extraction of a front edge portion (denoted by P in FIG. 5(c) of the reflected echo signal as a direct measure of the wave propagation time $t_E$.

Figure 6:
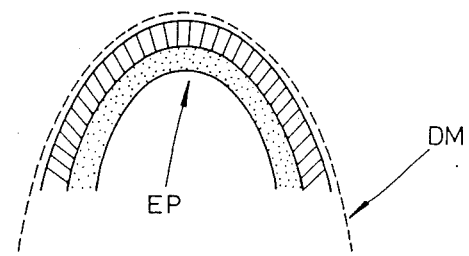
FIG. 6 is a diagram for showing, in detail, a positional relation when the false echo image is overlapped on the buried-material echo image.

With regard to this respect, the present embodiment apparatus is arranged so that, upon visualizing the aforementioned receive reflected echo signal is properly quantized and then ranked according to the echo level (in the present embodiment, ranked according to the color but may be ranked according to the lightness or the like) as preprocessings, thereby realizing the improvement of visibility of the echo image EP to be displayed. In practical cases, however, it is considered that the display color of the echo image EP corresponding to the front edge portion of the reflected echo signal cannot be sufficiently changed. To avoid this, it is preferable in the present embodiment apparatus to overlap the false echo image DM on the echo image EP in such a manner that the image DM is overlapped at its lower line on the upper line of the echo image EP as shown in FIG. 6.

Figure 7:
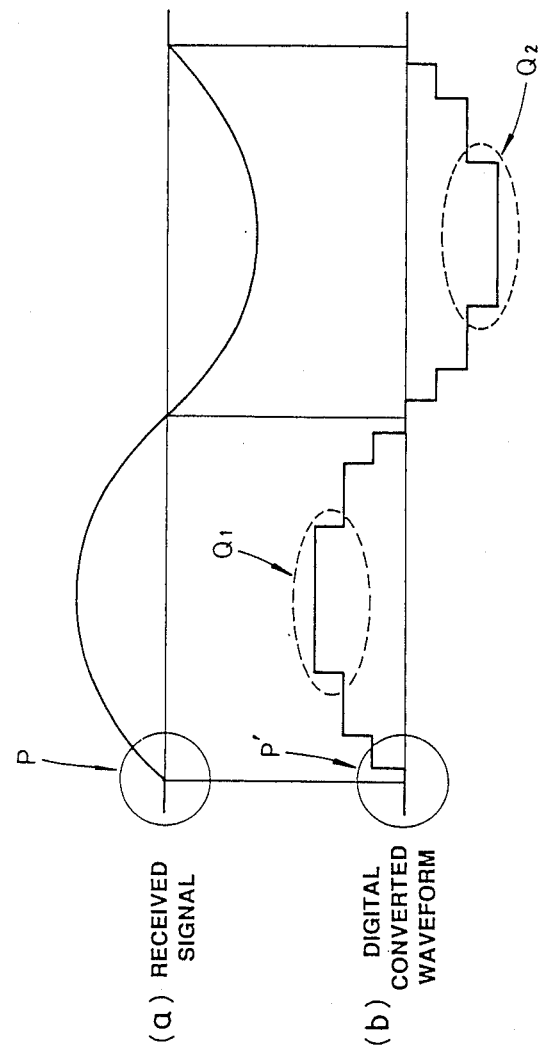
FIG. 7 is a timing chart showing an ordinary signal processing technique employed for the received electromagnetic wave (received signal)

Upon carrying out the aforementioned preprocessings, it has been common practice to quantize and convert such a receive signal (reflected echo signal) as shown in FIG. 7(a) into such a digital signal as shown, for example, in FIG. 7(b). It has been however impossible to sufficiently emphasize the aforementioned front edge portion P of the reflected echo signal with the use of only such analog-digital (A/D) conversion processing, and even if the aforementioned preprocessing is thereafter effected for its display, it has been difficult to ensure the sufficient visualization of the echo front edge portion P. This has let eventually to the fact that a portion of the reflected echo signal which is high in its amplitude level and more notably visualized, i.e., a portion $Q_1$ or $Q_2$ in FIG. 7 is erroneously recognized as the echo front edge portion, thus hindering the accurate identification of the wave propagation time $t_E$.

As described in the earlier-mentioned paper journal of the Institute of Electronics and Communication Engineerings of Japan, entitled "Underground Ladar System" (June, 1983, Vol. J66-B, No. 6, pp. 713–720), it is known that the deeper (further) the target is located the lower the amplitude level of the reflected echo signal is. This means that even an identical target can provide largely different amplitude levels of echo signals reflected on the target when the target is buried at different depths or located at different positions from the ladar unit.

For this reason, in the case where a plurality of reflected echo signals having different amplitude levels are obtained for a single target for instance, it is difficult to visually recognize that all of these echo signals refer to the same target, and when the target is located at a deeper (farther) position and the amplitude level of the reflected echo signal becomes lower, it also becomes further difficult to extract the front edge portion P of the reflected echo signal, which results in that the accurate identification of the wave propagation time $t_E$ becomes more difficult than the aforementioned case.

Second and third embodiments which will be detailed below are based on the foregoing first embodiment and directed to detecting apparatuses which facilitates the extraction of a front edge portion in such a reflected echo signal and thus enables the accurate identification of the wave propagation time under any circumstances.

Figure 8:
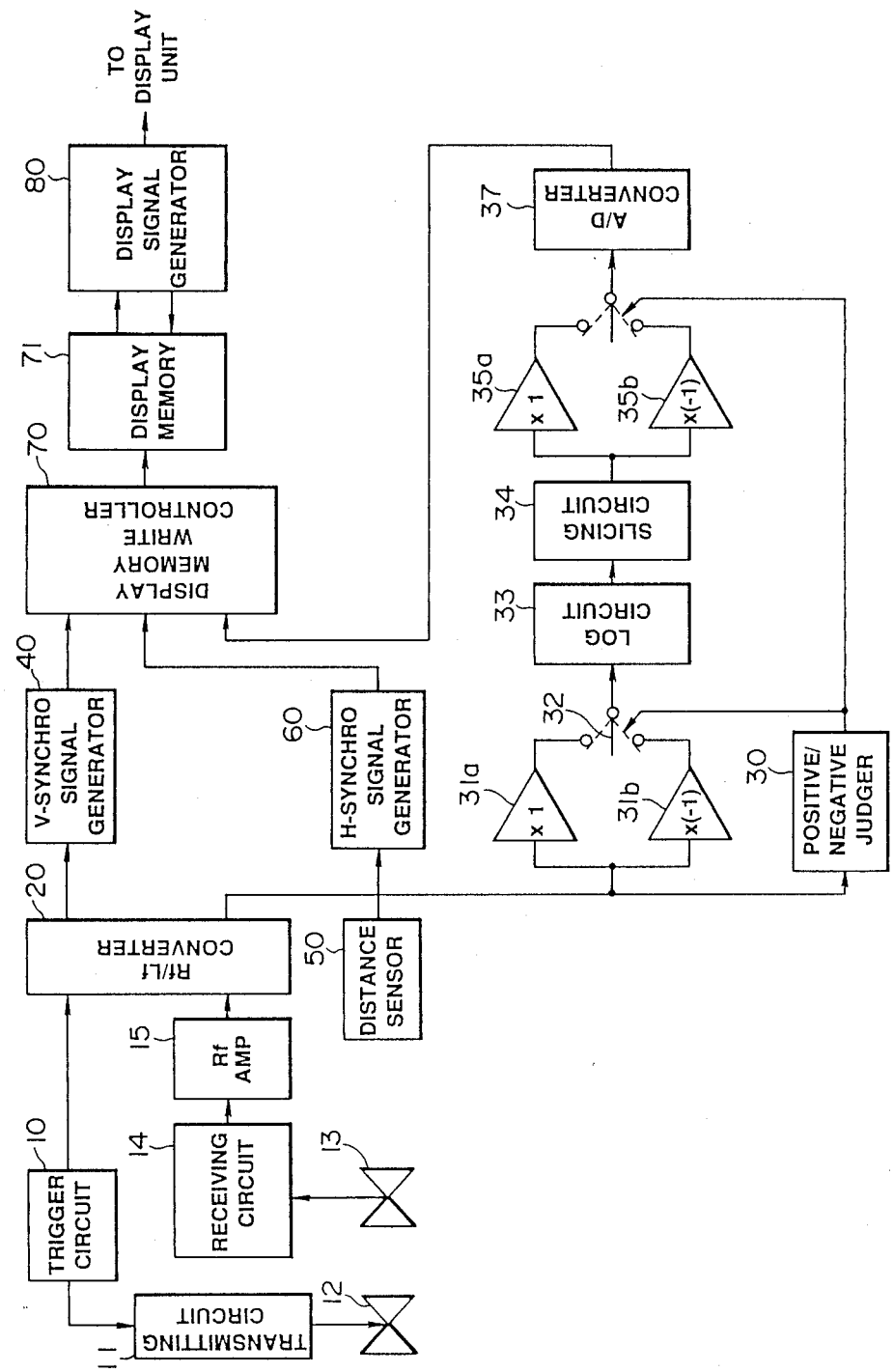
FIG. 8 is a block diagram showing a second embodiment of the buried-material detecting apparatus in accordance with the present invention.

Shown in FIG. 8 firstly as the second embodiment is a buried-object detecting apparatus which logarithm-converts a receive demodulation signal of the reflected echo signal to a logarithm demodulation signal and visually displays an echo image corresponding to the logarithm demodulation signal on a display unit as the echo image EP.

This second embodiment is also intended, as in the first embodiment apparatus of FIG. 1, to be mounted on a suitable mobile vehicle to carry out transmission and reception of electromagnetic waves while the vehicle is moving on the ground surface under which a target is buried, to thereby display a two-dimensional cross-sectional image of the target.

In the second embodiment apparatus of FIG. 8, a trigger circuit 10 oscillates to generate a trigger pulse at constant intervals, and a transmitting circuit 11 generates and amplifies a predetermined radar pulse in synchronism with the oscillation of the trigger pulse and supplies the radar pulse to a transmitting antenna 12, from which electromagnetic waves are radiated toward the ground.

If such a buried target object as a pipe is present in the ground, then the radiated waves are reflected on the target and reflected echo waves are received at a receiving antenna 13 and then sent therefrom to a receiving circuit 14. This received signal (reflected echo signal) is amplified to a predetermined level at an Rf amplifier 15 and then sent to an Rf/Lf (radio or high frequency/low frequency) converter 20 to be converted to a predetermined low frequency signal.

The received signal thus converted to the low frequency signal is further supplied to multipliers 31a and 31b having gains of (+1) and (−1) to be multiplied by constants respectively and then applied to a switch circuit 32.

The received signal thus converted to the low frequency signal is also applied to a positive/negative judging circuit 30 which in turn generates a positive/negative judgement signal for the received signal and sends it to the switch circuit 32 and another switch circuit 36 (to be explained later) to be used as a changeover signal.

In the present embodiment, the switch circuit 32 is arranged to selectively output an output signal of the (−1)-time multiplier 31b when the positive/negative judging circuit 30 generates a negative judgement signal and an output signal of the (+1)-time multiplier 31a when the circuit 30 generates a positive judgement signal. As a result, a combination of these positive/negative judging circuit 30, multipliers 31a and 31b, and switch circuit 32 produces an absolute value of the received signal.

Figure 9:
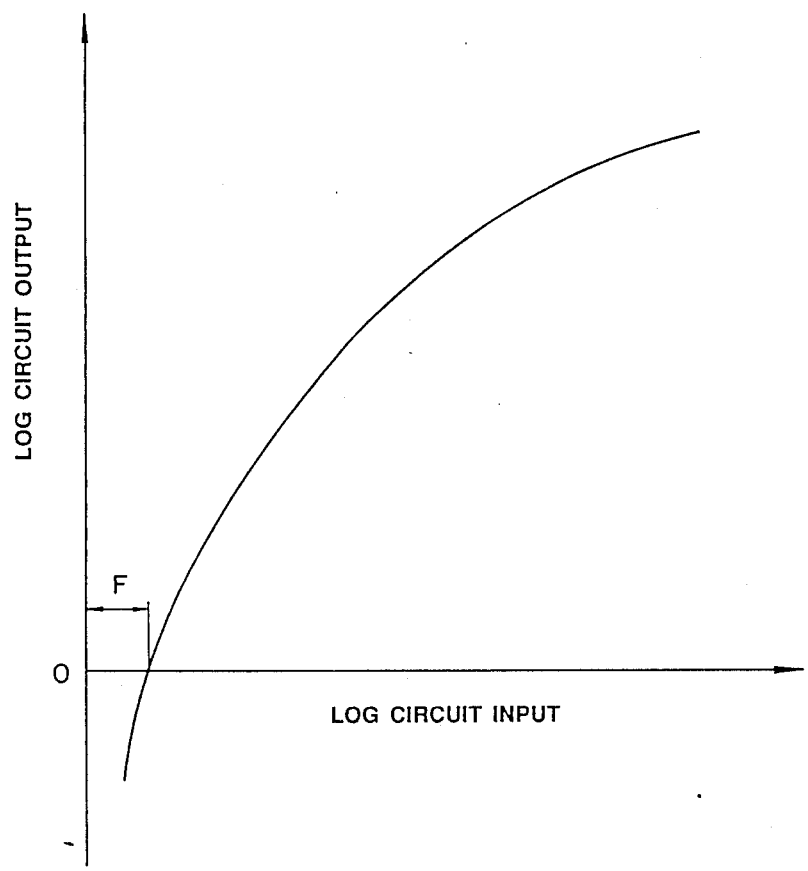
FIG. 9 is a graph showing an input/output characteristic of a logarithmic circuit used in the embodiment apparatus of FIG. 8.

The thus obtained absolute-value signal of the received signal is then applied to a logarithmic circuit 33 to be subjected thereat to a logarithmic processing based on such a logarithmic characteristic as shown, for example, in FIG. 9. Such a logarithmic circuit 33 may comprise a known logarithm converter (logarithm amplifier) using diodes or transistors. A parameter F given in FIG. 9 can be varied according to the base of the logarithm of the characteristic curve and practically set to be such a small value that can cut off such unnecessary components as noise and can minimize the rising delay of the output signal.

Figure 10:
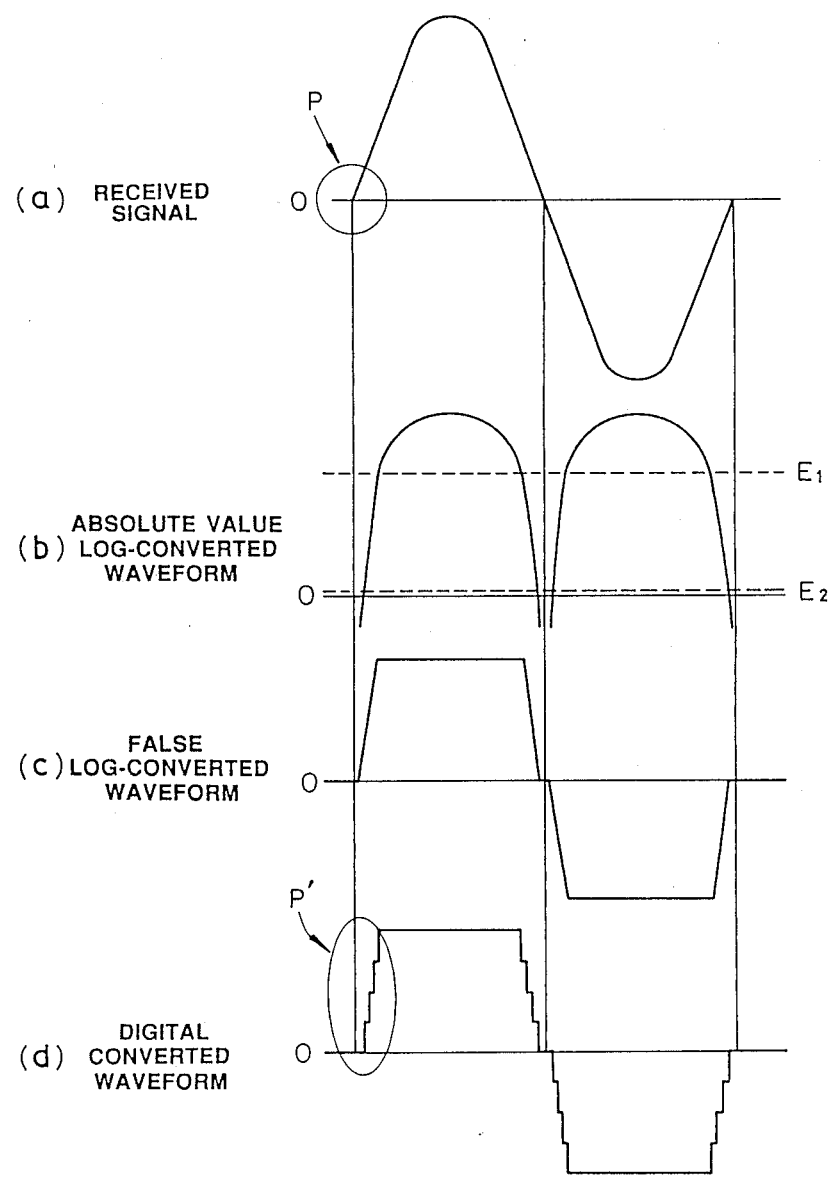
FIGS. 10, 11 and 12 are timing charts showing different examples of operation of the same embodiment apparatus respectively.
Figure 11:
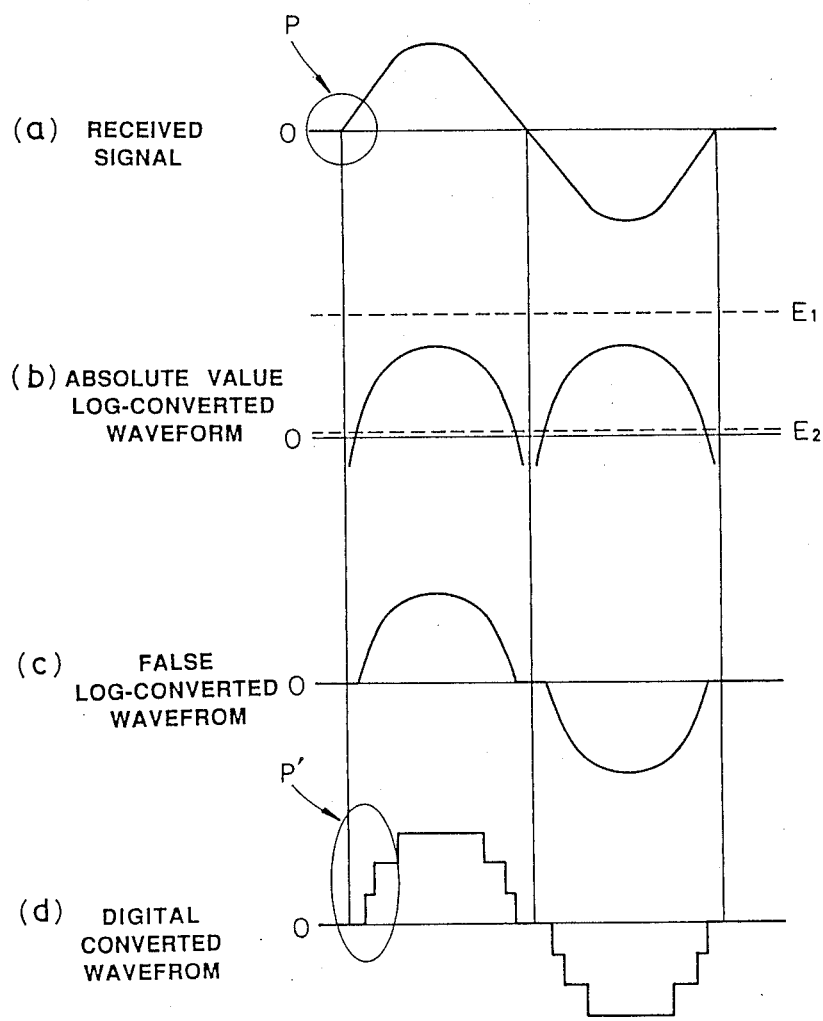
Figure 12:
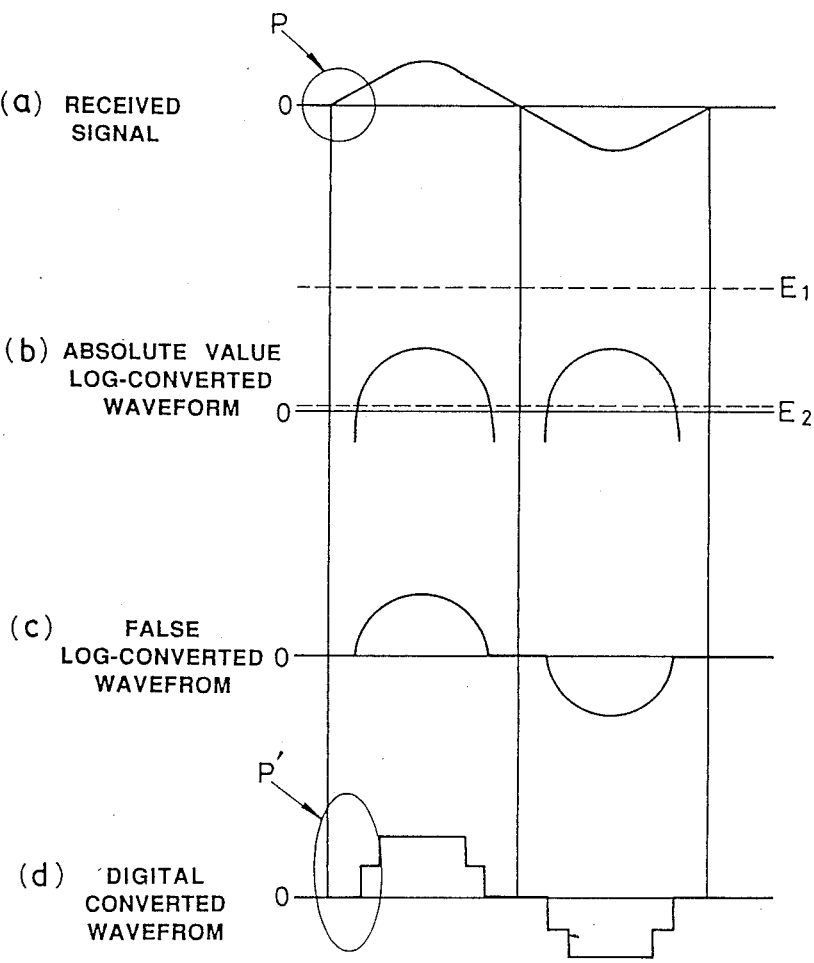

Through such absolute-value processing and logarithmic processing, such a received signal of relatively high amplitude level as shown, for example, in FIG. 10(a) is waveform-changed to such a signal as shown in FIG. 10(b); such a received signal of middle amplitude level as shown, for example, in FIG. 11(a) is waveform-changed to such a signal as shown in FIG. 11(b); and such a received signal as shown, for example, in FIG. 12(a) is waveform-changed to such a signal as shown in FIG. 12(b). respectively.

The received signal thus waveform-changed is then sent from the logarithmic circuit 33 to a slicing circuit 34 to be thereat sliced on the basis of upper and lower limit values E1 and E2 which are set therein to satisfy the following relationship.

$$0 < (\text{lower limit value E2}) < (\text{upper limit value E1}) \qquad (11)$$

The slicing circuit 34 may comprise a known limiting circuit or clamp circuit which functions to increase the input signal up to the lower limit value E2 when the input signal is smaller than the lower limit E2 and to reduce the input signal down to the upper limit value E1 when it is larger than the upper limit E1.

In the present embodiment apparatus, the lower limit value E2 is set to be "0" while the upper limit value E1 is set to be a value below the maximum of the input range of an A/D converter 37 (which will be explained later), as shown in FIG. 10(b), FIG. 11(b) or FIG. 12(b). In this case, the influence of the upper limit value E1 during the above slicing operation appears in the form of the saturation of the received data, which condition is illustrated in FIG. 10(b). Likewise, the influence of the lower limit value E2 during the slicing operation appears in the form of the discontinuity of the logarithm-converted signal in the vicinity of its zero level in the same drawing. Such phenomenon is remarkable, in particular, when the received signal is small in amplitude (refer to FIG. 12(b)).

The thus sliced signal is next sent to multipliers 35a and 35b having gains of (+1) and (−1) respectively as in the aforementioned multipliers 31a and 31b, to be multiplied by constants respectively and then applied to the second switch circuit 36. The switch 36, like the first switch circuit 32, is controllably switched on the basis of the judgement output of the positive/negative judging circuit 30. More specifically, the switch 36 selectively outputs an output signal of the (−1)-time multiplier 35b when the positive/negative judger 30 generates a negative judgement signal while and output signal of the (+1)-time multiplier 35a when the judger generates a positive judgement signal, respectively. That is, this results in that the received signal subjected to the (−1)-time multiplication and then to the absolute-value processing is subjected again to (−1)-time multiplication and returned to the original sign.

How the received signals having the three sorts of amplitude levels are returned to the original sign, are shown in FIG. 10(c), FIG. 11(c) and FIG. 12(c) respectively.

The received signal thus subjected to a so-called false logarithmic processing is finally subjected at an A/D converter 37 to predetermined sampling and quantizing operations 37 to predetermined sampling and quantizing operations and then applied to a write controller 70 for a display memory in the form of such a digital signal as shown in FIG. 10(d), FIG. 11(d) or FIG. 12(d) corresponding to each of three sorts of received signals.

Meanwhile, the trigger signal, which is generated from the trigger circuit 10, is applied to the transmitting circuit 11 to determine the wave signal transmission timing of the transmitting circuit 11; while the trigger signal is also applied to the Rf/Lf converter 20 to be converted to a second low frequency signal. (The converter 20 also receives the received signal amplified at the Rf amplifier 15 and converts it to the aforementioned first low frequency signal.) The trigger signal converted to the second low frequency signal is input to a vertical-synchronizing-signal generator 40 which in turn produces a vertical synchronizing signal indicative of the vertical-direction coordinate of the two-dimensional, cross-sectional display image of the target in question. And the vertical synchronizing signal is also applied to the display-memory write controller 70.

As has been already mentioned earlier, the distance sensor 50 is used to output a single pulse each time the mobile vehicle and thus apparatus carried thereon moves a predetermined distance. An output pulse or distance measurement signal of the sensor 50 is applied to a horizontal-synchronizing-signal generator 60 which in turn generates a horizontal synchronizing signal indicative of the horizontal-direction coordinate of the two-dimensional, cross-sectional display image of the target in question. The horizontal synchronizing signal is sent from the horizontal-synchronizing-signal generator 60 also to the display-memory write controller 70.

Thus, the display-memory write controller 70 receives the data of the two-dimensional coordinates generated and sent from the vertical-synchronizing-signal generator 40 and the horizontal-synchronizing-signal generator 60 as well as the data of the digitalized signal of the received signal sent from the A/D converter 37 to be displayed at the above two-dimensional coordinates.

The display-memory write controller 70 functions to perform write control over the a display memory for the above received-signal data on the basis of the aforementioned vertical and horizontal synchronizing signals. More in detail, the controller 70 is operated to sequentially convert to address values in the display memory 71 the values of the coordinates obtained in relation to the vertical and horizontal synchronizing signals and to sequentially write the aforementioned digital data of the received signal at an address determined by the converted address values.

A display-signal generator 80 performs the aforementioned ranking operation of color, lightness or the like according to the value of the received signal data to generate a display signal for the display unit 90 (refer to FIG. 2). More specifically, the generator 80 is operated to carry out, for example, two-dimensional raster scanning operation while sequentially reading out contents (the received signal data) written in the display memory 71 to thereby display the display signal indicative of the corresponding rank on the display unit 90.

The image (echo image EP) thus displayed on the display unit 90 becomes such a signal of digitally converted waveform that has a front edge portion P' corresponding to the emphasized front edge portion P of a received signal (reflected echo signal) and that is excellent in its contour visibility, as will be also seen from FIG. 10(d), FIG. 11(d) or FIG. 12(d) of the present embodiment apparatus.

Explanation will next be mase as to the third embodiment.

Figure 13:
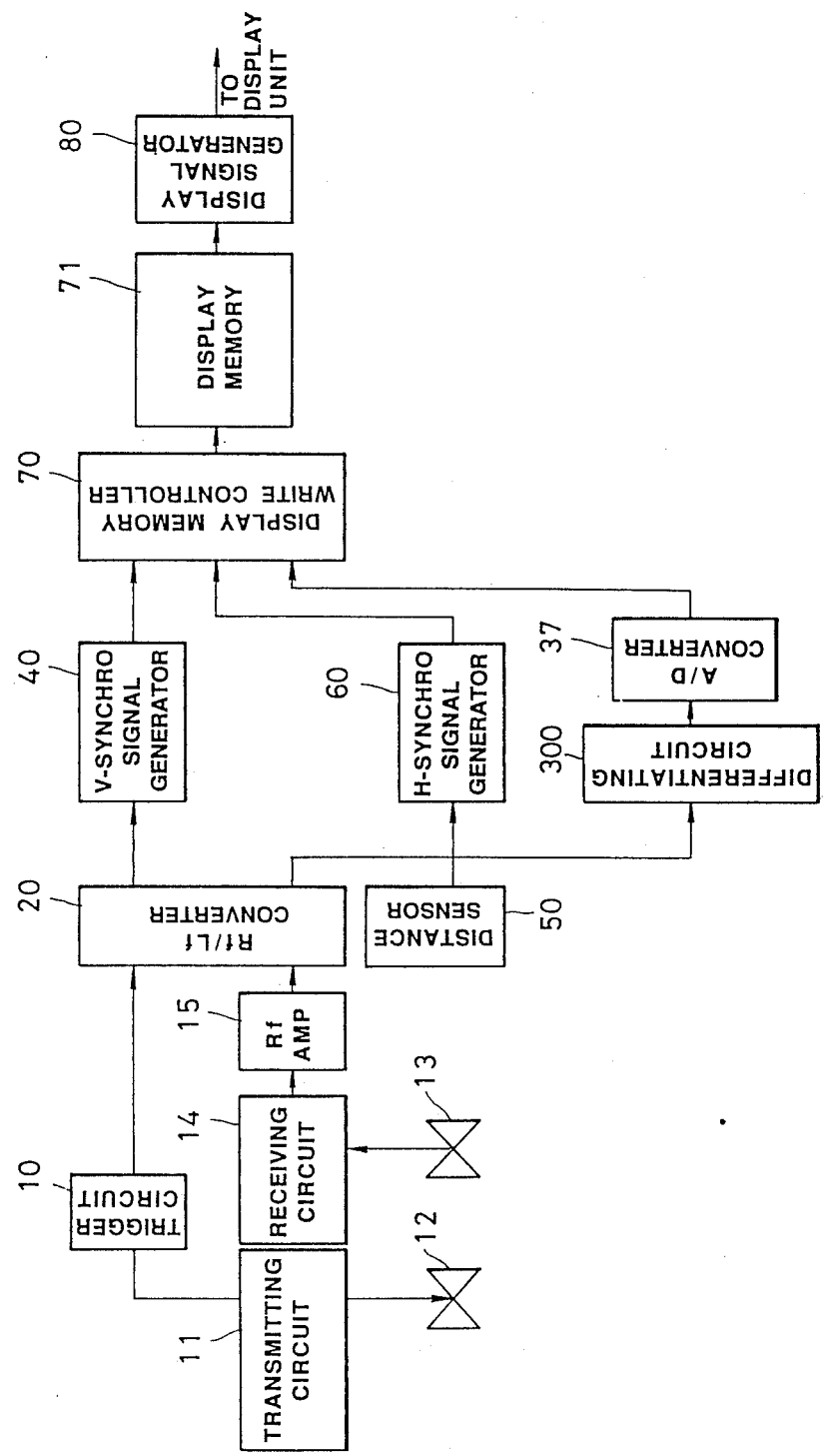
FIG. 13 is a block diagram showing a third embodiment of the buried-material detecting apparatus in accordance with the present invention.

Referring to FIG. 13, there is shown a buried-object detecting apparatus as the third embodiment which differentiates the demodulation signal of the reflected echo signal and visually displays on a display unit an echo image corresponding to the differentiated demodulation signal.

Even in the third embodiment, like the first embodiment apparatus of FIG. 1, the third embodiment apparatus is intended to be mounted on a suitable mobile vehicle so that the apparatus performs transmitting and receiving operations of electromagnetic waves while the apparatus carried on the vehicle is moved on the ground under which a target object is buried, to thereby display the two-dimensional cross-sectional image of the target in question.

In the third embodiment apparatus of FIG. 13, the trigger circuit 10 oscillates to generate a trigger pulse at constant intervals and the transmitting circuit 11 generates and amplifies a predetermined radar pulse signal in synchronism with the oscillation of the trigger pulse and supplies it to the transmitting antenna 12, from which the radar pulse signal is radiated toward the ground, as already mentioned above.

In the case where such a target object buried under the ground as a pipe is present, the electromagnetic waves of the radiated radar pulse signal are reflected on the target and the echo waves are received at the receiving antenna 13 and then sent as a received signal therefrom to the receiving circuit 14. The received signal (reflected echo signal) is amplified up to a predetermined level at the Rf amplifier 15 and then sent to the Rf/Lf (radio or high frequency/low frequency) converter 20 to be converted therein to a predetermined low frequency signal. The arrangement of the apparatus up to this stage is substantially the same as that of the previous second embodiment apparatus.

The received signal thus converted to the low frequency signal is further applied to a differentiating circuit 300 to be subjected thereat to a differentiating operation. The differentiating circuit 300 may comprise a known circuit using capacitors or the like.

Figure 14:
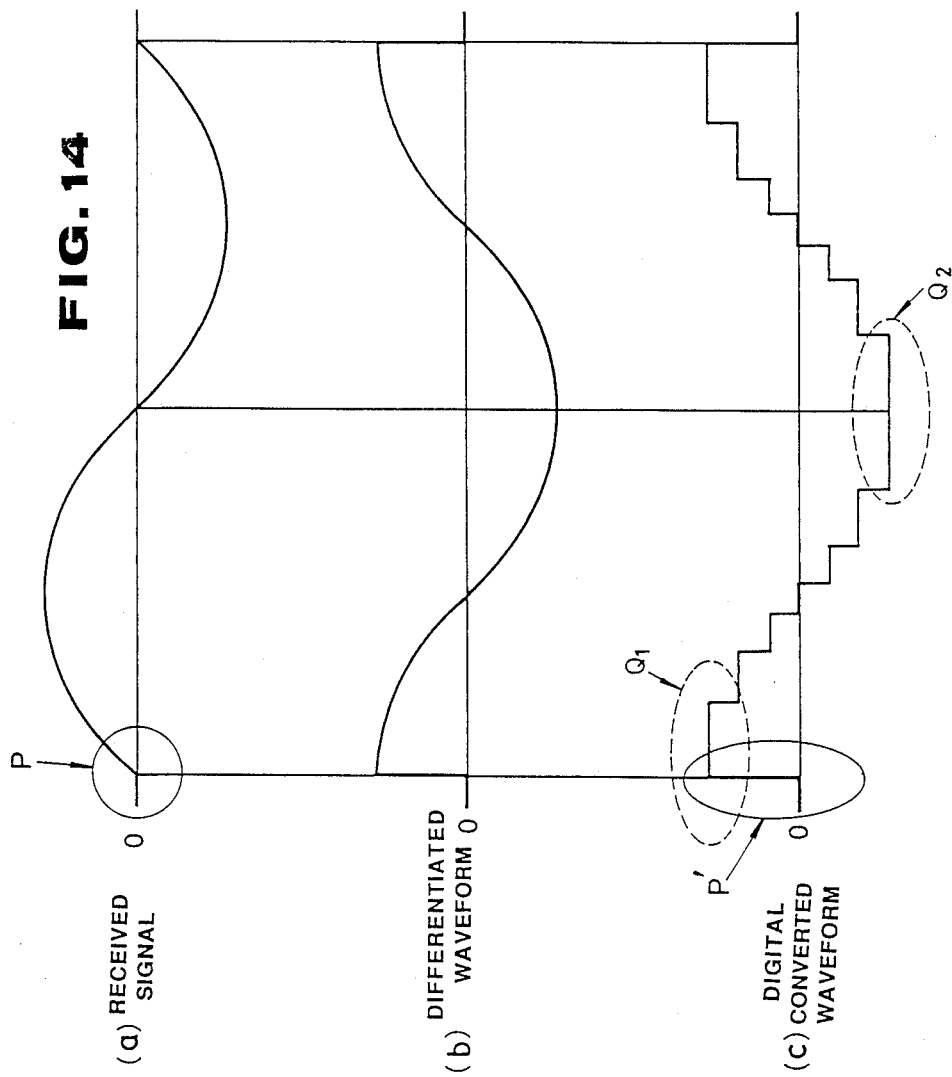
FIG. 14 is a timing chart showing an example of operation of the embodiment apparatus of FIG. 13.

Through the differentiating operation, such a received signal (reflected echo signal) as shown, for example, in FIG. 14(a), is changed with respect to waveform into such a signal as shown, for example, in FIG. 14(b). As a result, the front edge portion P of the echo signal waveform is emphasized to such maximum extent that corresponds to the maximum amplitude level of the waveform.

The received signal thus differentiated is then sent to the A/D converter 37 to be subjected thereat to predetermined sampling and quantizing operations so that such a differentiated signal as shown in FIG. 14(b) is converted to such a digital signal as shown, for example, in FIG. 14(c), and the digital signal is applied to the display-memory write control circuit 70.

On the other hand, the trigger signal, which is generated at the trigger circuit 10, is sent to the transmitting circuit 11 to determine the transmission timing of the transmitting circuit 11 and also sent to the Rf/Lf converter 20 to be converted thereat to another low frequency signal, similarly to the low frequency signal to which the received signal amplified at the Rf amplifier 15 is converted at the converter 20. The trigger signal converted to the low frequency signal is supplied to the vertical-synchronizing-signal generator 40 which generates a vertical synchronizing signal indicative of a vertical-direction coordinate of the two-dimensional cross-sectional display images of the target in question. And the vertical synchronizing signal is applied also to the display-memory write controller 70.

The distance sensor 50 outputs a single pulse each time the mobile vehicle and thus the apparatus mounted thereon is moved by a predetermined distance. An output pulse or distance measurement signal of the sensor 50 is supplied to the horizontal-synchronizing-signal generator 60 which generates a horizontal synchronizing signal indicative of a horizontal-direction coordinate of the two-dimensional cross-sectional display image of the target in question. The horizontal synchronizing signal generated at the horizontal-synchronizing-signal generator 60 is applied also to the display-memory write controller 70.

In this way, the display-memory write controller 70 receives the data of the two-dimensional coordinates generated through the vertical- and horizontal-synchronizing-signal generators 40 and 60 as well as the data of the received signal that is digitalized through the A/D converter 37 and that is to be displayed at a position of the two-dimensional coordinates.

As in the foregoing embodiment, the display-memory write controller 70 is used to perform its write control over the display memory 71 of the aforementioned received signal data on the basis of the vertical and horizontal synchronizing signals. More in detail, the controller 70 is operated to sequentially convert to address values in the display memory 71 the values of the coordinates obtained in relation to the vertical and horizontal synchronizing signals and to sequentially write the aforementioned digital data of the received signal at an address determined by the converted address values.

The display-signal generator 80, also as in the foregoing embodiment, performs the aforementioned ranking operation of color, lightness or the like according to the value of the received signal data to generate a display signal for the display unit 90 (refer to FIG. 1). More specifically, the generator 80 is operated to carry out, for example, two-dimensional raster scanning operation while sequentially reading out contents (the received signal data) written in the display memory 71 to thereby display the display signal indicative of the corresponding rank on the display unit 90.

The image (echo image EP) thus displayed on the display unit 90 becomes such a signal of digitally converted waveform that has a front edge portion P' (which portion itself corresponds to a noticeably visible portion $Q_1$) corresponding to the emphasized front edge portion P of a received signal (reflected echo signal) and that is excellent in its contour visibility, as will be also seen from FIG. 14(c) of the previous embodiment apparatus.

In this manner, in accordance with the foregoing second and third embodiment apparatuses, the front edge portion (P, P') of the reflected echo signal can be desirably emphasized regardless of the magnitude of the amplitude level of the reflected echo signal and thus the hyperbolic echo signal image can be improved in visibility. In these second and third embodiment apparatuses, in addition, the hyperbolic data of the echo image EP, which has been so far able to be expressed only in the case of the employment of such multi-tone as 256 or more tones, can be sufficiently expressed with use of only a less number of tones, for example, only about 8 tones. Accordingly, when the arrangement of the second or third embodiment apparatus is employed in the arithmetic unit 100 (FIG. 1) of the first embodiment apparatus, there can be realized a buried-material detecting apparatus which is excellent in accuracy, operating convenience and economy.

Although the received signal (reflected echo signal) has been subjected to a logarithmic operation at the stage of its analog signal in the foregoing second embodiment apparatus, it goes without saying that the analog signal may be converted to a digital signal without any subjection of such logarithmic operation and then the digital signal may be subjected to the logarithmic operation. This can be easily realized by employing a logarithmic converting ROM or the like element which has such an input/output characteristic as shown in FIG. 9.

Even in the foregoing third embodiment apparatus, it is of course possible to convert the received signal (reflected echo signal) to a digital signal without any subjection of an A/D conversion and then to subject the converted digital signal to a differentiating operation, though the received signal has been differentiated at the stage of its analog signal. In the former case, this can be achieved by performing a differential operation to obtain a difference between continuous two data. In the case where this differential operation is carried out, for example, within a computer, the following techniques (a) and (b) can be employed.

(a) The differential operation is actually carried out.
(b) The results of the differential operation are previously stored in the form of a table and continuous data values are later retrieved from the table.

And when it is desired to carry out the differential operation with use of a digital type hardware circuit, the following techniques (c) and (d) can be used.

(c) A subtraction circuit is used for actually effecting the differentiating operation.

(d) The results of the differentiating operation are previously stored in such a memory element as a ROM or RAM and the contents of the memory are read out from the memory on the basis of the memory address of continuous data values.

Industrial Applicability

As has been disclosed in the foregoing, in accordance with the present invention, the position of the echo image of a buried-object as well as the expansion of the opening of the hyperbolic echo image are detected by overlapping the false echo image on the echo image of the object and the wave propagation velocity in the ground soil is calculated on the basis of the detected values to thereby detect the position of the buried object. As a result, the need for an instrument for measuring the specific dielectric constant of the ground soil can be eliminated allowing the inexpensive arrangement of the apparatus, and the position of event such an object as buried under the ground below the asphalt pavement can be accurately detected. Further, no use of the estimated value of the specific dielectric constant of the ground soil enables the elimination of a position detection error based on an estimation error, thus realizing the highly accurate positional detection. In addition, since the need for complicated operations including matrix computation can be removed, the position detection result can be obtained in a short time.

I claim:

1. A buried-object detecting apparatus which emits electromagnetic waves from a transmitter mounted on a mobile vehicle toward the ground, receives waves reflected on an object buried under the ground at a receiver mounted on said mobile vehicle and detects a position of said buried object on the basis of a propagation time of said reflected waves; characterized by comprising:

means for displaying echo images of the buried object with parameters of a depth direction of the buried material and a movement direction of the mobile vehicle;

first means, on the basis of said propagation time of the reflected waves obtained when the mobile vehicle is moved by a predetermined distance while emitting electromagnetic waves from said transmitter mounted on the mobile vehicle, for forming a hyperbolic echo image and causing said hyperbolic echo image to be displayed on said display means;

second means for forming a hyperbolic false echo image having as a parameter a coefficient for converting underground propagation speed of the electromagnetic wave to distance information and for causing said false echo image to be displayed on the display means;

third means for obtaining a vertex position of said false echo image based on an operation for moving display position of said false echo image in which operation the vertex position of said false echo image is caused to be coincided with a vertex position of said echo image of buried object;

fourth means for obtaining said coefficient for converting the underground propagation speed into the distance information based on an operation for changing display modes of the false echo image in which operation an expansion of opening of said false echo image is caused to be overlapped with that of said echo image of the buried object; and fifth means for obtaining the position of said buried object by correcting the coordinates of the vertex position of said false echo image obtained by said third means with the use of the coefficient obtained by the fourth means.

2. A buried-object detecting apparatus as set forth in claim 1, wherein said first means includes means for subjecting a demodulation signal of a received signal of said reflected waves to a logarithmic conversion to display on said display means an echo image corresponding to said demodulation subjected to the logarithmic conversion.

3. A buried-object detecting apparatus as set forth in claim 1, wherein said first means includes means for subjecting a demodulation signal of a received signal of said reflected waves to a differentiating operation to display on said display means an echo image corresponding to said demodulation subjected to the differentiating operation.

* * * * *